(12) United States Patent
Jia et al.

(10) Patent No.: US 10,509,984 B2
(45) Date of Patent: Dec. 17, 2019

(54) METHOD AND SYSTEM FOR EXTRACTING AND CLASSIFYING FEATURES OF HYPERSPECTRAL REMOTE SENSING IMAGE

(71) Applicant: SHENZHEN UNIVERSITY, Shenzhen, Guangdong (CN)

(72) Inventors: Sen Jia, Guangdong (CN); Jie Hu, Guangdong (CN); Lin Deng, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 45 days.

(21) Appl. No.: 15/978,189

(22) Filed: May 13, 2018

(65) Prior Publication Data
US 2018/0260657 A1  Sep. 13, 2018

Related U.S. Application Data

(63) Continuation of application No. PCT/CN2016/104268, filed on Nov. 1, 2016.

(51) Int. Cl.
*G06K 9/00* (2006.01)
*G06K 9/62* (2006.01)
*G06K 9/46* (2006.01)

(52) U.S. Cl.
CPC ........... *G06K 9/6212* (2013.01); *G06K 9/00* (2013.01); *G06K 9/00208* (2013.01); *G06K 9/46* (2013.01); *G06K 9/6267* (2013.01); *G06K 2009/4666* (2013.01)

(58) Field of Classification Search
None
See application file for complete search history.

(56) References Cited

U.S. PATENT DOCUMENTS 8,649,607 B1 * 2/2014 Hayat .................. G06K 9/6289
382/159

OTHER PUBLICATIONS

Fehr, Janis, and Hans Burkhardt. "3D rotation invariant local binary patterns." 2008 19th International Conference on Pattern Recognition. IEEE, 2008. (Year: 2008).*

(Continued)

*Primary Examiner* — Sean M Conner

(57) ABSTRACT

The present invention provides a method for extracting and classifying features of hyperspectral remote sensing image, including: an sampling step, a binarizing step, a coding step, a statistical calculating step, a concatenating step, and a classifying step. The present invention further provides a system for extracting and classifying features of hyperspectral remote sensing image. The technical solution provided by the present invention can make full use of the contextual relationship between the spectral domain and the spatial domain in a hyperspectral remote sensing image by extending two-dimensional LBPs into three-dimensional LBPs, and has good robustness to noise by introducing a relaxation threshold discrimination operation. Furthermore, the rotation-invariant three-dimensional LBP model provided by the present invention takes account of the essential characteristics of the hyperspectral remote sensing image, and therefore the present solution has advantages that it is targeted, simple in operation and high in calculation efficiency.

2 Claims, 3 Drawing Sheets

(56) References Cited

OTHER PUBLICATIONS

Li, Wei, et al. "Local binary patterns and extreme learning machine for hyperspectral imagery classification." IEEE Transactions on Geoscience and Remote Sensing 53.7 (2015): 3681-3693. (Year: 2015).*

Montagne, Christophe, et al. "3D Local Binary Pattern for PET image classification by SVM, Application to early Alzheimer disease diagnosis." 2013. (Year: 2013).*

Musci, Marcelo, et al. "Assessment of binary coding techniques for texture characterization in remote sensing imagery." IEEE Geoscience and Remote Sensing Letters 10.6 (2013): 1607-1611. (Year: 2013).*

Paulhac, Ludovic, Pascal Makris, and Jean-Yves Ramel. "Comparison between 2D and 3D local binary pattern methods for characterisation of three-dimensional textures." International Conference Image Analysis and Recognition. Springer, Berlin, Heidelberg, 2008. (Year: 2008).*

\* cited by examiner

METHOD AND SYSTEM FOR EXTRACTING AND CLASSIFYING FEATURES OF HYPERSPECTRAL REMOTE SENSING IMAGE

CROSS REFERENCE TO RELATED APPLICATIONS

The present application is a Continuation Application of PCT application No. PCT/CN2016/104268 filed on Nov. 1, 2016, the contents of which are hereby incorporated by reference.

TECHNICAL FIELD

The present invention relates to the field of image processing, and in particular to a method and system for extracting and classifying features of hyperspectral remote sensing image.

BACKGROUND

Hyperspectral remote sensing images acquired by imaging a ground object by a remote sensor in visible, near-infrared, mid-infrared, and thermal infrared wavelength ranges of the electromagnetic spectrum not only provide spatial and geometrical information of the ground object, but also contain abundant spectral information that represents physical properties specific to the ground object. Therefore, hyperspectral classification techniques have come into being for identifying a ground object by extracting features and knowledge, such as the spectrum, texture, and shape, of the ground object, from a hyperspectral remote sensing image.

The earliest hyperspectral classification technique simply used spectral features for classification. However, due to the influence of various factors such as illumination, climate changes, cloud thickness, and mixed image elements, the phenomena of same object with different spectrums and same spectrum for different objects often occur in a hyperspectral remote sensing image, which leads to severe misclassification. Also, since a hyperspectral remote sensing image contains abundant spatial structure information about the ground object, precision in ground object classification can be improved effectively by taking overall consideration of the spatial and spectral information in hyperspectral data, thereby obtaining a classification map with desirable spatial continuity. Research on hyperspectral remote sensing image classification that combines spectral features with spatial features has become a current hot topic, and the essential issue for such research consists in extracting spatial structure information such as the texture, shape, object, and semantics, and combining appropriately the spectral information and the spatial features. Depending on different combinations of spectral features and spatial features, spectral-spatial classification techniques can be roughly classified into two strategies: combined processing and fused processing.

With a combined processing strategy, the extracted spatial features and spectral features are both input to a classifier to obtain a classification result (briefly referred to as spatial information preprocessing), or otherwise, object regularization is performed on the original classification result by means of image segmentation, so as to obtain a classification map with high spatial homogeneity (briefly referred to as spatial information postprocessing). Spatial information preprocessing mainly involves spatial feature extraction processes such as morphological analysis and spatial filtering based on edge preserving and sparse representation, and spatial information postprocessing mainly involves processes such as multiple logistic regression and hypergraph generation. Due to introduction of spatial information, the combined spectral-spatial feature classification process is effective in classification and low in calculation complexity. However, the hyperspectral remote sensing image itself has a three-dimensional structure, and yet the spatial features and spectral features obtained through the combined spatial information processing are separated, therefore the contextual relationship between the spectrum and the spatial structure has been ignored. Meanwhile, the spatial information postprocessing relies on the classification result, therefore misclassification of most of one type of ground objects may be exacerbated by postprocessing.

With a fused processing strategy, an integrated spatial-spectral feature description is obtained by performing mathematical operations directly on the original spectral data by using a set of predefined multiscale kernels or three-dimensional filters. As in such a process, the three-dimensional hyperspectral remote sensing image is processed as a whole, such that the contextual relationship between the spectral domain and the spatial domain can be adequately mined, this process has received increasing attention. However, since the spectral and spatial distribution structure of the ground object is generally unknown, a sufficient number of scales or three-dimensional filters has to be defined in order to obtain a sufficient amount of integrated spatial-spectral representative features, resulting in an extremely large feature dimension and a large feature redundancy, which makes the classification process very time-consuming, thereby reducing practicability of the algorithm.

Currently, the contextual relationship between the spectral domain and the spatial domain has been ignored in prior art, and therefore, depiction and extraction of the intrinsic structural and statistical relationship between spectral and spatial information in the data are not adequate or accurate and may generate a large amount of redundant information.

SUMMARY

In view of this, it is an objective of the present invention to provide a method and system for extracting and classifying features of hyperspectral remote sensing image which can overcome the drawbacks in prior art of ignorance of the contextual relationship between the spectral domain and the spatial domain, sensitivity to noise, redundant model features, and complex calculation processes.

The present invention provides a method for extracting and classifying features of hyperspectral remote sensing image, mainly including:

a step of sampling, in which six vertices in an octahedral domain of each pixel are used as sampling points in a three-dimensional Local Binary Pattern, and a local spatial-spectral structure of the pixel is described by using a gray level distribution T of the six sampling points, where T≈t($g_0$, $g_1$, $g_2$, $g_3$, $g_4$, $g_5$), which represents the gray level distribution of the six sampling points, with $g_0$, $g_1$, $g_2$, $g_3$, $g_4$, and $g_5$ representing a pixel value of the six sampling points respectively;

a step of binarizing, in which gray values of the six vertex pixels in the octahedron are respectively compared with a pixel value of a central point, and if an absolute value of a difference between the two is lower than a predefined discriminant threshold, label the corresponding vertex pixel as 1, otherwise, label the corresponding vertex pixel as 0, so as to form a binary pattern T1 for the local spatial-spectral structure of the central pixel, where T1≈t(s(g$_0$−g$_c$), s(g$_1$−g$_c$), ..., s(g$_5$−g$_c$)), with g$_c$ representing the pixel value of the central point;

a step of coding, in which each of the binary patterns having the same spatial topology is uniquely labeled with the number of 1s in the binary pattern, so as to obtain a three-dimensional local binary code for each of the binary patterns, that is, $$3DLBP = \begin{cases} \Sigma_{p=0}^{5} s(g_p - g_c) & \text{, if } \Gamma(T1) \leq 6 \\ 7 & \text{, else} \end{cases},$$

where the spatial topology of the binary pattern is calculated by equation:

$$\Gamma(T1) = \sum_{p=0}^{5} |s(g_i - g_c) - s(g_j - g_c)|,$$

such that binary patterns with the same value of Γ are determined to have the same spatial topology, in which g$_i$ and g$_j$ represent the ith and jth sampling points in the binary pattern respectively, g$_i$ and g$_j$ are adjacent to each other, and i≠j, i, j∈{0, 1, 2, 3, 4, 5};

a step of statistical calculatining, in which after the three-dimensional Local Binary Pattern code is obtained for each pixel, a co-occurrence frequency for eight three-dimensional Local Binary Pattern codes of 0, 1, 2, 3, 4, 5, 6, and 7 is statistically calculated within an n×n rectangular neighborhood of each of the pixels in an image element, so as to obtain a histogram feature of the pixel;

a step of concatenating, in which the histogram features of all the pixels in the image element are concatenated sequentially, so as to obtain a three-dimensional Local Binary Pattern feature corresponding to the image element; and a step of classifying, in which the obtained three-dimensional Local Binary Pattern feature is sent to a classifier for classification.

In another aspect, the present invention further provides a system for extracting and classifying features of hyperspectral remote sensing image, including:

a sampling module, configured to use six vertices in an octahedral domain of each pixel as sampling points in a three-dimensional Local Binary Pattern, and describe a local spatial-spectral structure of the pixel by using a gray level distribution T of the six sampling points, where T≈t(g$_0$, g$_1$, g$_2$, g$_3$, g$_4$, g$_5$), representing the gray level distribution of the six sampling points, with g$_0$, g$_1$, g$_2$, g$_3$, g$_4$, and g$_5$ representing a pixel value of the six sampling points respectively;

a binarizing module, configured to compare gray values of the six vertex pixels in the octahedron respectively with a pixel value of a central point, and if an absolute value of a difference between the two is lower than a predefined discriminant threshold, label the corresponding vertex pixel as 1, otherwise, label the corresponding vertex pixel as 0, so as to form a binary pattern T1 for the local spatial-spectral structure of the central pixel, where T1≈t(s(g$_0$−g$_c$), s(g$_1$−g$_c$), ..., s(g$_5$−g$_c$)), with g$_c$ representing the pixel value of the central point;

a coding module, configured to uniquely label each of the binary patterns having the same spatial topology with the number of 1s in the binary pattern, so as to obtain a three-dimensional local binary code for each of the binary patterns, that is, $$3DLBP = \begin{cases} \Sigma_{p=0}^{5} s(g_p - g_c) & \text{, if } \Gamma(T1) \leq 6 \\ 7 & \text{, else} \end{cases},$$

where the spatial topology of the binary pattern is calculated by $$\Gamma(T1) = \sum_{p=0}^{5} |s(g_i - g_c) - s(g_j - g_c)|,$$

such that binary patterns with the same value of Γ are determined to have the same spatial topology, in which g$_i$ and g$_j$ represent the ith and jth sampling points in the binary pattern respectively, g$_i$ and g$_j$ are adjacent to each other, and i≠j, i, j∈{0, 1, 2, 3, 4, 5};

a statistical calculating module, configured to, after the three-dimensional Local Binary Pattern code is obtained for each pixel, statistically calculate a co-occurrence frequency for eight three-dimensional Local Binary Pattern codes of 0, 1, 2, 3, 4, 5, 6, and 7 within an n×n rectangular neighborhood of each of the pixels in an image element, so as to obtain a histogram feature of the pixel;

a concatenating module, configured to concatenate the histogram features of all the pixels in the image element sequentially, so as to obtain a three-dimensional Local Binary Pattern feature corresponding to the image element; and a classifying module, configured to send the obtained three-dimensional Local Binary Pattern feature to a classifier for classification.

The technical solution provided by the present invention can make full use of the contextual relationship between the spectral domain and the spatial domain in the hyperspectral remote sensing image by extending two-dimensional Local Binary Patterns (LBP) into three-dimensional LBPs and has good robustness to noise by introducing a relaxation threshold discrimination operation. Furthermore, the rotation-invariant three-dimensional LBP model provided by the present invention takes account of the essential characteristics of the hyperspectral remote sensing image, and therefore the present solution has advantages that it is targeted, simple in operation, and high in calculation efficiency.

DESCRIPTION OF THE EMBODIMENTS

In order to make the objectives, technical solutions and advantages of the present invention more apparent and comprehensible, the present invention will be further described in detail below with reference to the accompanying drawings and embodiments. It should be understood that the specific embodiments described herein are merely used to explain the present invention, and are not intended to limit the present invention.

A method for extracting and classifying features of hyperspectral remote sensing image provided by the present invention will be described in detail below.

Figure 1:
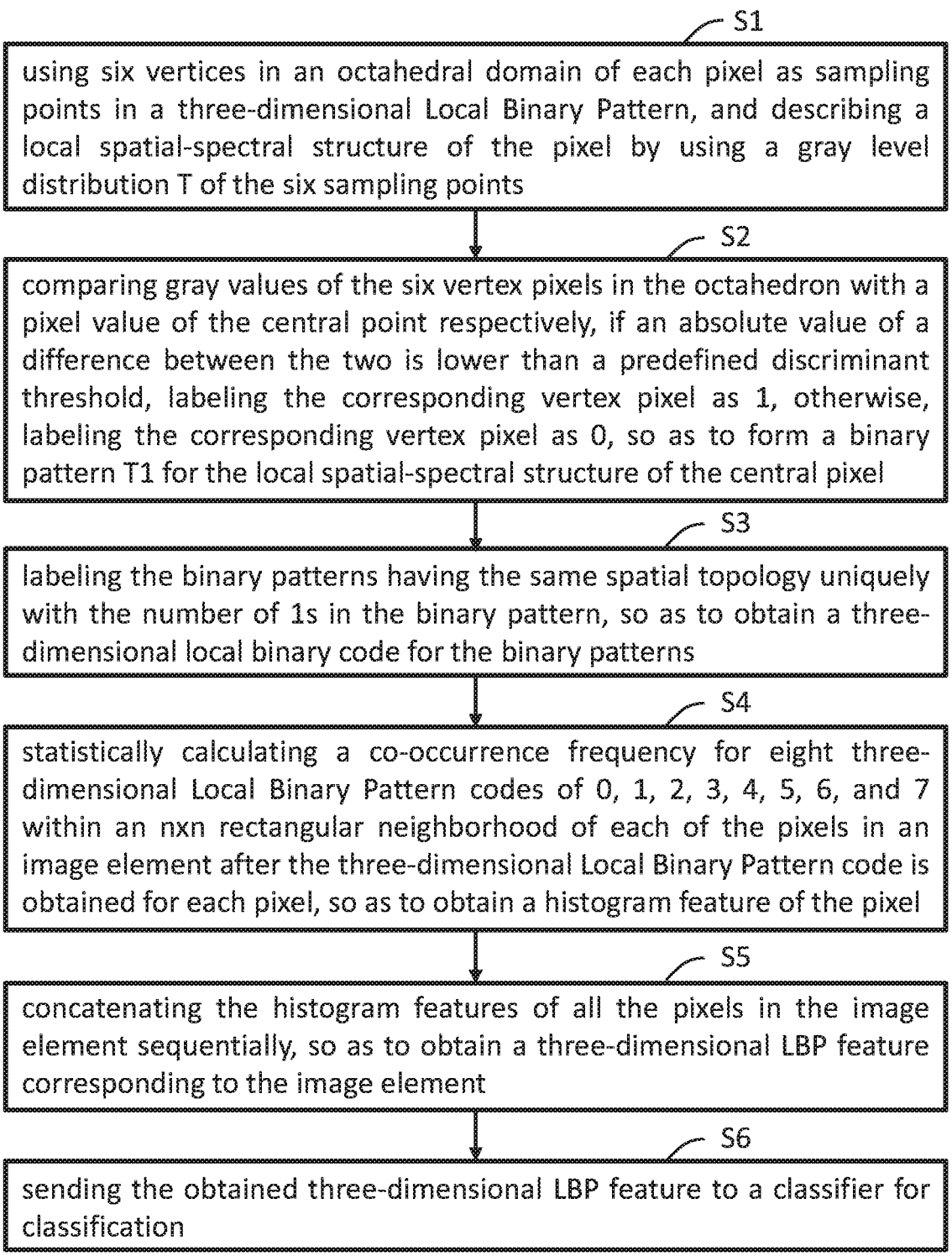
FIG. 1 is a flowchart of a method for extracting and classifying features of hyperspectral remote sensing image according to an embodiment of the present invention.

Referring to FIG. 1, which is a flowchart of a method for extracting and classifying features of hyperspectral remote sensing image according to an embodiment of the present invention.

In this embodiment, the steps of sampling, binarizing, coding, statistical calculating, concatenating, and classifying are shown as steps S1-S6, respectively and correspondingly, in FIG. 1.

In step S1, namely the sampling step, six vertices in an octahedral domain of each pixel are used as sampling points in a three-dimensional Local Binary Pattern, and a local spatial-spectral structure of the pixel is described by using a gray level distribution T of the six sampling points, wherein $T \approx t(g_0, g_1, g_2, g_3, g_4, g_5)$, which represents the gray level distribution of the six sampling points, with $g_0, g_1, g_2, g_3, g_4$, and $g_5$ representing a pixel value of the six sampling points respectively.

Figure 2:
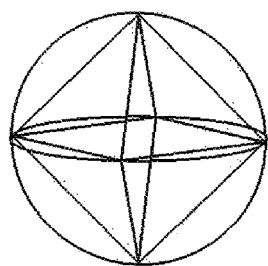
FIG. 2 is a schematic view of an octahedral sampling model that is approximately spherical used in a three-dimensional LBP according to an embodiment of the present invention.

In this embodiment, sampling is performed on a spherical neighborhood of a central pixel having a radius of R by using a three-dimensional Local Binary Pattern (LBP) model, in which an octahedron that is approximately spherical is used, that is, six vertices of the octahedron are used as the sampling points. Assuming that the radius R is 1, the six sampling points are respectively the six pixels at the left, right, top, bottom, front, and rear of the central pixel. The gray level distribution of the six sampling points characterizes the local spatial-spectral structure of the central pixel. FIG. 2 shows an octahedral sampling model that is approximately spherical used in the three-dimensional LBP.

In step S2, i.e., the binarizing step, gray values of the six vertex pixels in the octahedron are respectively compared with a pixel value of the central point, and if an absolute value of a difference between the two is lower than a predefined discriminant threshold, then label the corresponding vertex pixel as 1, otherwise, label the corresponding vertex pixel as 0, so as to form a binary pattern T1 for the local spatial-spectral structure of the central pixel, wherein $T1 \approx t(s(g_0-g_c), s(g_1-g_c), \ldots, s(g_5-g_c))$, with $g_c$ representing the pixel value of the central point.

In this embodiment, the binarization is performed on the local spatial-spectral structure. In order to calculate the gray level distribution T of the six sampling points, for each pixel, the gray value of each of the vertex pixels in its octahedral neighborhood having a circumscribed circle of a radius R is compared with the pixel value of the central point, which is the central point of the octahedron. If an absolute value of a difference between the gray value of a vertex pixel and the pixel value of the central pixel is lower than the predefined discriminant threshold, then label the vertex pixel as 1, otherwise, label it as 0. The labeled vertices in the octahedral neighborhood are referred to as the binary pattern T1 for the local spatial-spectral structure of the central pixel. Said binary pattern T1 is expressed by $$T1 \approx t(s(g_0-g_c), s(g_1-g_c), \ldots, s(g_5-g_c));$$

where $g_c$ represents the pixel value of the central point, and $\delta$ represents the predefined discriminant threshold, with $$s(x) = \begin{cases} 1, x \geq \delta \\ 0, x < \delta \end{cases}.$$

Figure 3:
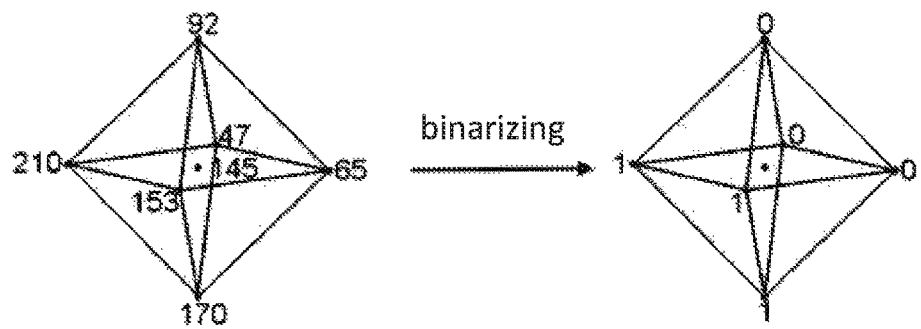
FIG. 3 is a schematic view showing a process of binarization of the local spatial-spectral structure according to an embodiment of the present invention.

In this embodiment, the local spatial-spectral structure of the central pixel is binarized by using the gray value of the central pixel. If an absolute value of a difference between the gray value of a sampling point and the gray value of the central pixel is greater than the discriminant threshold, then label the sampling point as 1, otherwise label it as 0. The binarized local spatial-spectral structure of the central pixel is referred to as its binary pattern. FIG. 3 shows the process of binarization of the local spatial-spectral structure. In FIG. 3, the left part shows the local spatial-spectral structure of the central point pixel having a gray value of 145, and the right part shows the corresponding binary pattern after binarization thereof.

In step S3, each of the binary patterns having the same spatial topology is uniquely labeled with the number of 1s in the binary pattern, so as to obtain a three-dimensional local binary code for each of the binary patterns, that is, $$3DLBP = \begin{cases} \Sigma_{p=0}^{5} s(g_p - g_c) & \text{, if } \Gamma(T1) \leq 6 \\ 7 & \text{, else} \end{cases},$$

wherein the spatial topology of the binary pattern is calculated by equation $$\Gamma(T1) = \sum_{p=0}^{5} |s(g_i - g_c) - s(g_j - g_c)|,$$

such that binary patterns with the same value of $\Gamma$ are determined to have the same spatial topology, where $g_i$ and $g_j$ represent the ith and jth sampling points in the binary pattern respectively, $g_i$ and $g_j$ are adjacent to each other, and $i \neq j$, $i, j \in \{0, 1, 2, 3, 4, 5\}$.

In this embodiment, different binary patterns may correspond to the same local spatial-spectral structure. In order to identify such a phenomenon, the 64 binary patterns may be constrained to 8 types according to the spatial topology of the binary patterns. Assuming that $\Gamma$ represents the spatial topology of the binary pattern and different values of $\Gamma$ correspond to binary patterns having different local spatial-spectral structures, then the spatial topology of the binary pattern may be calculated with the expression of:

$$\Gamma(T1) = \sum_{p=0}^{5} |s(g_i - g_c) - s(g_j - g_c)|;$$

There are different number of 1s in the binary patterns having different spatial topologies. Each of the binary patterns having the same spatial topology is uniquely labeled with the number of 1s in the binary pattern, so as to obtain a three-dimensional Local Binary Pattern (3DLBP) code for each of the binary patterns in the neighborhood of the central pixel. Such a process may be mathematically expressed as $$3DLBP = \begin{cases} \Sigma_{p=0}^{5} s(g_p - g_c) & \text{, if } \Gamma(T1) \leq 6 \\ 7 & \text{, else} \end{cases}.$$

Figure 4:
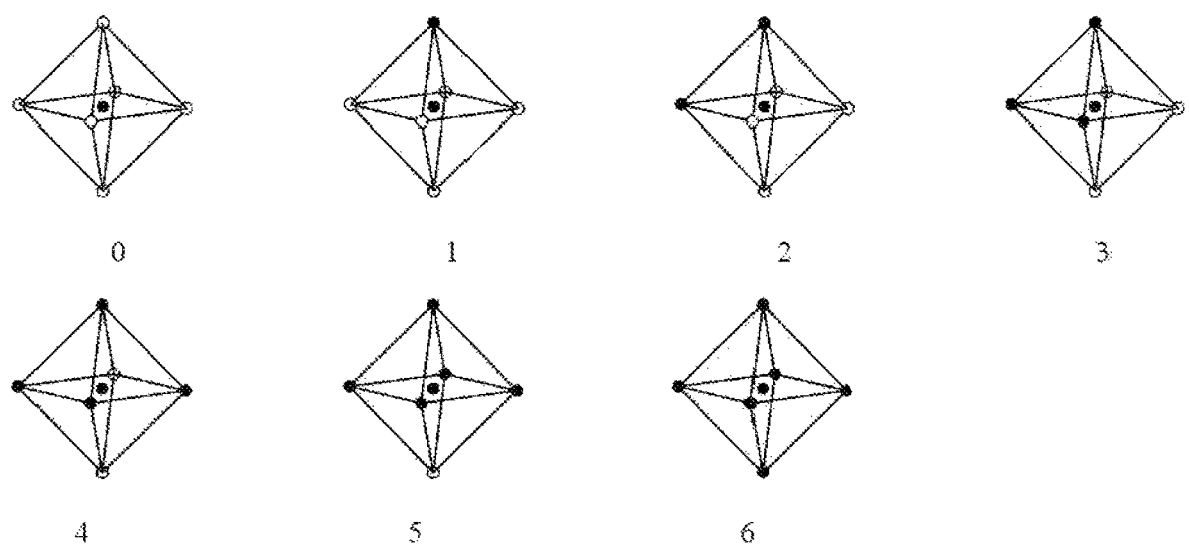
FIG. 4 is a schematic view of seven binary patterns with different spatial topologies according to an embodiment of the present invention.

In this embodiment, said code is a three-dimensional Local Binary Pattern code. To distinguish between the local spatial-spectral structures surrounding individual pixels, different codes are used to label their binary patterns. Different binary patterns may correspond to the same local spatial-spectral structure. To identify such a phenomenon, each of the binary patterns is coded according to the spatial topology of the binary pattern. The term of "spatial topology of the binary pattern" means the distribution of 1s in the three-dimensional space corresponding to the binary pattern. The 64 different binary patterns generated from the six sampling points are constrained to 8 types according to their spatial topologies. These 8 types of patterns correspond respectively to different local spatial-spectral structures, and are designated sequentially as 0, 1, 2, 3, 4, 5, 6, and 7. FIG. 4 shows a schematic view of seven types of binary patterns with different spatial topologies 0, 1, 2, 3, 4, 5, and 6, which include respectively 1, 6, 12, 8, 12, 6, 1 binary patterns. In the figure, the solid point represents 1, and the hollow point represents 0. In the 7 types of patterns, the 1s are located close to one another in the octahedral neighborhood and are not in the same line, and the difference among these patterns lies in the different number of 1s.

In step S4, after the three-dimensional Local Binary Pattern code is obtained for each pixel, a co-occurrence frequency for eight three-dimensional Local Binary Pattern codes of 0, 1, 2, 3, 4, 5, 6, and 7 is statistically calculated within an n×n rectangular neighborhood of each of the pixels in an image element, so as to obtain a histogram feature of the pixel.

In this embodiment, the histogram feature represents the distribution of the eight different three-dimensional local binary codes within the n×n rectangular neighborhood of the pixel.

In step S5, the histogram features of all the pixels in the image element are concatenated sequentially, so as to obtain a three-dimensional LBP feature corresponding to the image element.

In step S6, the obtained three-dimensional LBP feature is sent to a classifier for classification.

In this embodiment, a common classifier, such as a KNN (k-Nearest Neighbor), a SVM (Support Vector Machine), and SRC (Sparse Representation Classification), may be used for classification of hyperspectral remote sensing images.

The method for extracting and classifying features of hyperspectral remote sensing image provided by the present invention can make full use of the contextual relationship between the spectral domain and the spatial domain in the hyperspectral remote sensing image by extending two-dimensional LBPs into three-dimensional LBPs, and has good robustness to noise by introducing a relaxation threshold discrimination operation. Furthermore, the rotation-invariant three-dimensional LBP model provided by the present invention takes account of the essential characteristics of the hyperspectral remote sensing image, and therefore the present solution has advantages that it is targeted, simple in operation, and high in calculation efficiency.

In the following, a system for extracting and classifying features of hyperspectral remote sensing image provided by the present invention will be described in detail.

Figure 5:
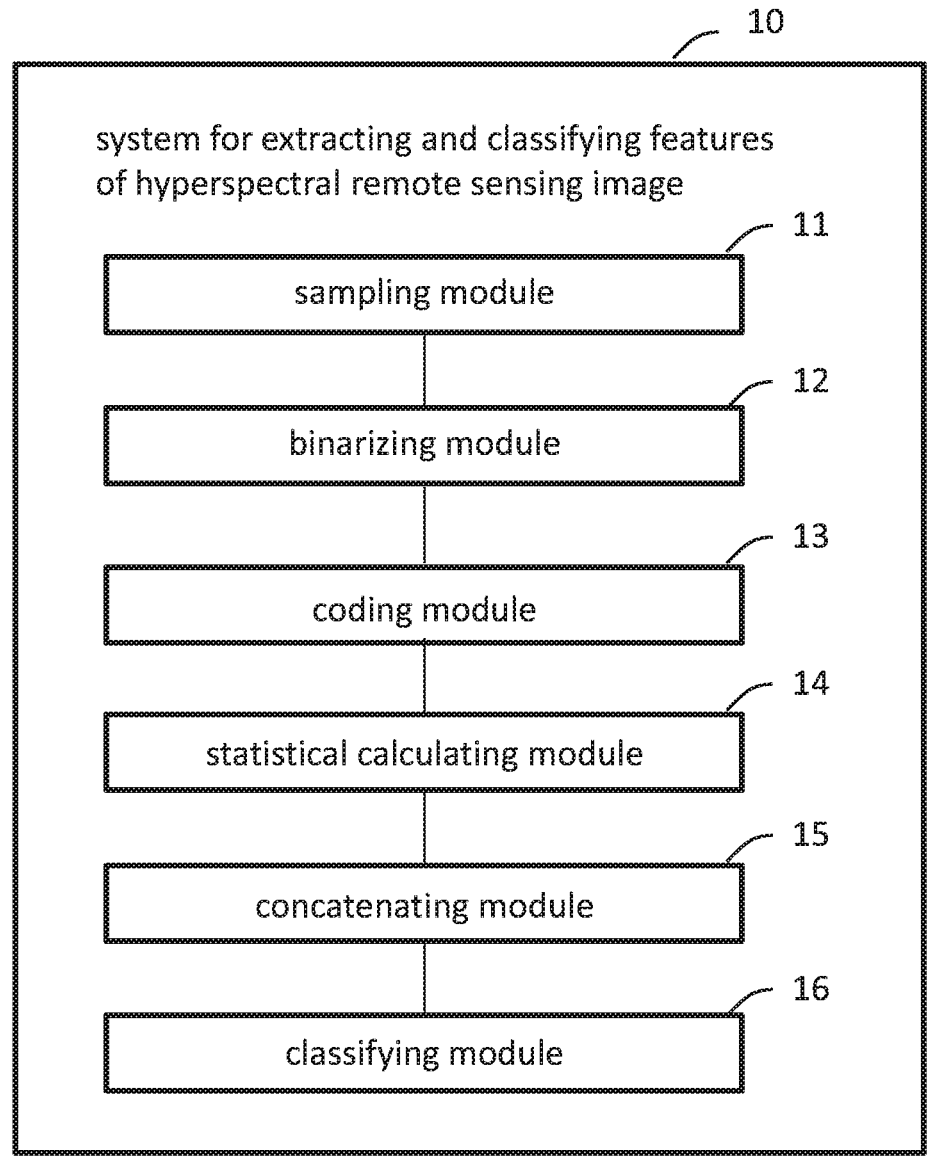
FIG. 5 is a schematic structural view of a system for extracting and classifying features of hyperspectral remote sensing image according to an embodiment of the present invention.

Refer to FIG. 5, which shows a schematic structural view of a system for extracting and classifying features of hyperspectral remote sensing image 10 according to an embodiment of the present invention.

In this embodiment, the system for extracting and classifying features of hyperspectral remote sensing image 10 mainly includes a sampling module 11, a binarizing module 12, a coding module 13, a statistical calculating module 14, a concatenating module 15, and a classifying module 16.

The sampling module 11 is configured to use six vertices in an octahedral domain of each pixel as sampling points in a three-dimensional Local Binary Pattern, and describe a local spatial-spectral structure of the pixel by using a gray level distribution T of the six sampling points, where $T \approx t(g_0, g_1, g_2, g_3, g_4, g_5)$, which represents the gray level distribution of the six sampling points, with $g_0$, $g_1$, $g_2$, $g_3$, $g_4$, and $g_5$ representing a pixel value of the six sampling points respectively.

In this embodiment, the sampling module 11 performs a sampling process as explained above with regard to step S1, which will not be explained again herein.

The binarizing module 12 is configured to compare gray values of the six vertex pixels in the octahedron respectively with a pixel value of a central point, and if an absolute value of a difference between the two is lower than a predefined discriminant threshold, label the corresponding vertex pixel as 1, otherwise, label the corresponding vertex pixel as 0, so as to form a binary pattern T1 for the local spatial-spectral structure of the central pixel, where $T1 \approx t(s(g_0 - g_c), s(g_1 - g_c), \ldots, s(g_5 - g_c))$, with $g_c$ representing the pixel value of the central point.

In this embodiment, the binarizing module 12 performs a binarizing process as explained above with regard to step S2, which will not be explained again herein.

The coding module 13 is configured to uniquely label each of the binary patterns having the same spatial topology with the number of 1s in the binary pattern, so as to obtain a three-dimensional local binary code for each of the binary patterns, that is, $$3DLBP = \begin{cases} \Sigma_{p=0}^{5} s(g_p - g_c) & \text{, if } \Gamma(T1) \leq 6 \\ 7 & \text{, else} \end{cases},$$

where the spatial topology of the binary pattern is calculated by equation:

$$\Gamma(T1) = \sum_{p=0}^{5} |s(g_i - g_c) - s(g_j - g_c)|,$$

such that binary patterns with the same value of $\Gamma$ are determined to have the same spatial topology, in which $g_i$ and $g_j$ represent the ith and jth sampling points in the binary pattern respectively, $g_i$ and $g_j$ are adjacent to each other, and $i \neq j$, $i, j \in \{0, 1, 2, 3, 4, 5\}$.

In this embodiment, the coding module 13 performs a coding process as explained above with regard to step S3, which will not be explained again herein.

The statistical calculating module 14 is configured to, after the three-dimensional Local Binary Pattern code is obtained for each pixel, statistically calculate a co-occurrence frequency for eight three-dimensional Local Binary Pattern codes of 0, 1, 2, 3, 4, 5, 6, and 7 within an n×n rectangular neighborhood of each of the pixels in an image element, so as to obtain a histogram feature of the pixel.

The concatenating module 15 is configured to concatenate the histogram features of all the pixels in the image element sequentially, so as to obtain a three-dimensional Local Binary Pattern feature corresponding to the image element.

The classifying module 16 is configured to send the obtained three-dimensional Local Binary Pattern feature to a classifier for classification.

The system for extracting and classifying features of hyperspectral remote sensing image features 10 provided by the present invention can make full use of the contextual relationship between the spectral domain and the spatial domain in the hyperspectral remote sensing image by extending two-dimensional LBPs into three-dimensional LBPs, and has good robustness to noise by introducing a relaxation threshold discrimination operation. Furthermore, the rotation-invariant three-dimensional LBP model provided by the present invention takes account of the essential characteristics of the hyperspectral remote sensing image, and therefore the present solution has advantages that it is targeted, simple in operation, and high in calculating efficiency.

The three-dimensional LBP features extracted according to the present invention have better discrimination capability than two-dimensional LBP features, as will be explained and confirmed with classification results from two data sets with different resolutions and sizes. The first data set is acquired by a ROSIS-03 sensor at Pavia Centre in Italy (Pavia Centre, URL: http://www.ehu.eus/ccwintco/index.php?title=Hyperspectral Remote Sensing Scenes), and has a total of 102 spectral bands, each of which has an image size of 610×340, a spatial resolution of 1.3 m/pixel, 42776 labeled samples, and a total of 9 types of ground objects. The second data set is acquired by NSF-funded Center for Airborne Laser Mapping over the University of Houston campus and the neighboring urban area on Jun. 23, 2012 (Houston University, URL: http://www.grss-ieee.org/community/technical-committees/data-fusion/2013-ieee-grss-data-fusi on-contest/). This data set has 144 spectral bands, each of which has an image size of 349×1905, a spatial resolution of 2.5 m/pixel, 15029 labeled samples, and a total of 15 types of ground objects. Classification results obtained by using sparse representation suggest that the accuracy in the classification result based on three-dimensional LBP features is far higher than that based on two-dimensional LBP features, particularly for small sample classification. In the case of three samples, with the Pavia Centre data set, the classification result based on two-dimensional LBP feature exhibits an accuracy of 72.75%, whereas the classification result based on three-dimensional LBP features exhibits an accuracy up to 92.87%; and with the Houston University data set, the classification result based on two-dimensional LBP features exhibits an accuracy of 45.98%, whereas the classification result based on three-dimensional LBP features exhibits an accuracy up to 68.61%. Comparison of the results shows that three-dimensional LBP features allow a far higher classification accuracy than two-dimensional LBP features, and this effect is particularly notable in the case of small sample classification.

It should be noted that, in the above embodiments, the included units are only divided according to the functional logic, but are not limited to the above division as long as the corresponding functions can be realized. In addition, the specific names of the functional units are merely for the convenience of distinguishing from each other and not for limiting the protection scope of the present invention.

In addition, those skilled in the art may understand that all or some of the steps in the method in the above embodiments may be implemented by relevant hardware as instructed by a program, and the related program may be stored in a computer-readable storage medium, such as ROM/RAM, a magnetic disk or an optical disc.

The foregoing descriptions are merely preferred embodiments of the present invention, and are not used to limit the present invention. Any modifications, equivalent replacements, and improvements made within the spirit and principle of the present invention should be encompassed within the protection scope of the present invention.

What is claimed is:

1. A method for extracting and classifying features of a hyperspectral remote sensing image, the method comprising:

a step of sampling, in which, for each respective pixel in the hyperspectral remote sensing image, six vertex pixels in an octahedral domain of a central pixel corresponding to the each respective pixel are used as sampling points in a three-dimensional Local Binary Pattern (3DLBP), and a local spatial-spectral structure of the central pixel is described by using a gray level distribution T of the six sampling points, where $T \approx t(g_0, g_1, g_2, g_3, g_4, g_5)$, which represents the gray level distribution of the six sampling points, with $g_0, g_1, g_2, g_3, g_4$, and $g_5$ representing a pixel value of the six sampling points respectively;

a step of binarizing, in which gray values of the six vertex pixels in the octahedral domain are respectively compared with a pixel value of the central pixel, and if an absolute value of a difference between values of the central pixel and a corresponding vertex pixel among the six vertex pixels is lower than a predefined discriminant threshold, label the corresponding vertex pixel as 1, otherwise, label the corresponding vertex pixel as 0, so as to form a binary pattern T1 for the local spatial-spectral structure of the central pixel, where $T1 \approx t(s(g_0-g_c), s(g_1-g_c), \ldots, s(g_5-g_c))$, with $g_c$ representing the pixel value of the central pixel and s representing a binary function;

a step of coding, in which each of the binary patterns having a same spatial topology is uniquely labeled with the number of 1s in the binary pattern, so as to obtain a 3DLBP code for each of the binary patterns, that is, $$3DLBP = \begin{cases} \Sigma_{p=0}^{5} s(g_p - g_c) & , \text{if } \Gamma(T1) \leq 6 \\ 7 & , \text{else} \end{cases},$$

where the spatial topology of the binary pattern is calculated by equation:

$$\Gamma(T1) = \sum_{p=0}^{5} |s(g_i - g_c) - s(g_j - g_c)|,$$

such that binary patterns with the same value of $\Gamma$ are determined to have the same spatial topology, in which $g_i$ and $g_j$ represent the ith and jth sampling points in the binary pattern respectively, $g_i$ and $g_j$ are adjacent to each other, and $i \neq j$, $i, j \in \{0, 1, 2, 3, 4, 5\}$;

a step of statistical calculating, in which after the 3DLBP code is obtained for each pixel, a co-occurrence frequency for eight 3DLBP codes of 0, 1, 2, 3, 4, 5, 6, and 7 is statistically calculated within an n×n rectangular neighborhood of each of the pixels in an image element, so as to obtain a histogram feature of the pixel;

a step of concatenating, in which the histogram features of all the pixels in the image element are concatenated sequentially, so as to obtain a 3DLBP feature corresponding to the image element; and a step of classifying, in which the obtained 3DLBP feature is sent to a classifier for classification.

2. A system for extracting and classifying features of a hyperspectral remote sensing image, the system comprising:

a sampling module, configured to, for each respective pixel in the hyperspectral remote sensing image, use six vertex pixels in an octahedral domain of a central pixel corresponding to the each respective pixel as sampling points in a three-dimensional Local Binary Pattern (3DLBP), and describe a local spatial-spectral structure of the central pixel by using a gray level distribution T of the six sampling points, where $T \approx t(g_0, g_1, g_2, g_3, g_4, g_5)$, representing the gray level distribution of the six sampling points, with $g_0$, $g_1$, $g_2$, $g_3$, $g_4$, and $g_5$ representing a pixel value of the six sampling points respectively;

a binarizing module, configured to compare gray values of the six vertex pixels in the octahedral domain respectively with a pixel value of the central pixel, and if an absolute value of a difference between values of the central pixel and a corresponding vertex pixel among the six vertex pixels is lower than a predefined discriminant threshold, label the corresponding vertex pixel as 1, otherwise, label the corresponding vertex pixel as 0, so as to form a binary pattern T1 for the local spatial-spectral structure of the central pixel, where $T1 \approx t(s(g_0-g_c), s(g_1-g_c), \ldots, s(g_5-g_c))$, with $g_c$ representing the pixel value of the central pixel and s representing a binary function;

a coding module, configured to uniquely label each of the binary patterns having a same spatial topology with the number of is in the binary pattern, so as to obtain a 3DLBP code for each of the binary patterns, that is, $$3DLBP = \begin{cases} \Sigma_{p=0}^{5} s(g_p - g_c) & , \text{if } \Gamma(T1) \leq 6 \\ 7 & , \text{else} \end{cases},$$

where the spatial topology of the binary pattern is calculated by $$\Gamma(T1) = \sum_{p=0}^{5} |s(g_i - g_c) - s(g_j - g_c)|,$$

such that binary patterns with the same value of f are determined to have the same spatial topology, in which $g_i$ and $g_j$ represent the ith and jth sampling points in the binary pattern respectively, $g_i$ and $g_j$ are adjacent to each other, and $i \neq j$, $i, j \in \{0, 1, 2, 3, 4, 5\}$;

a statistical calculating module, configured to, after the 3DLBP code is obtained for each pixel, statistically calculate a co-occurrence frequency for eight 3DLBP codes of 0, 1, 2, 3, 4, 5, 6, and 7 within an n×n rectangular neighborhood of each of the pixels in an image element, so as to obtain a histogram feature of the pixel;

a concatenating module, configured to concatenate the histogram features of all the pixels in the image element sequentially, so as to obtain a 3DLBP feature corresponding to the image element; and a classifying module, configured to send the obtained 3DLBP feature to a classifier for classification.

* * * * *